Jan. 17, 1961 M. L. CHANKO 2,968,076
HOLDER MEANS FOR SPECTACLES
Filed June 24, 1957
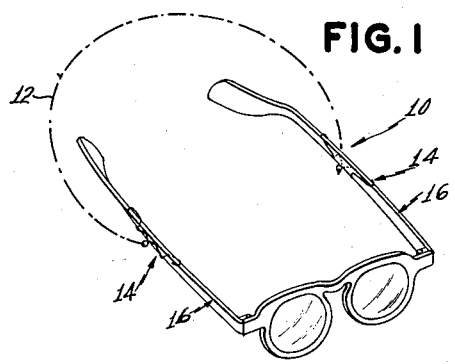
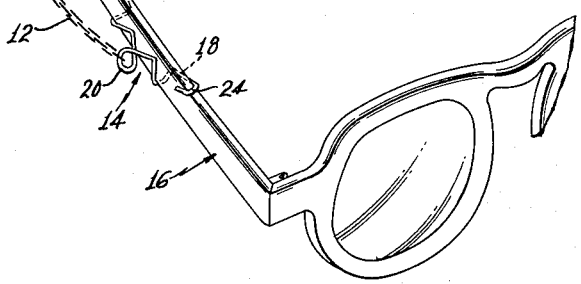
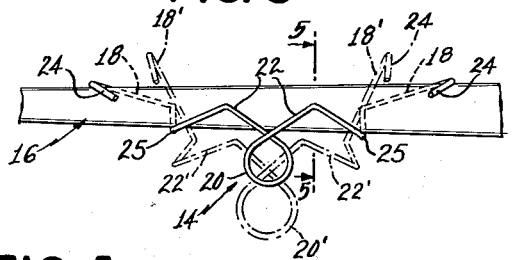
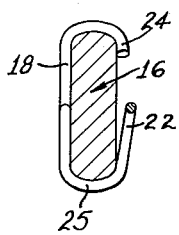
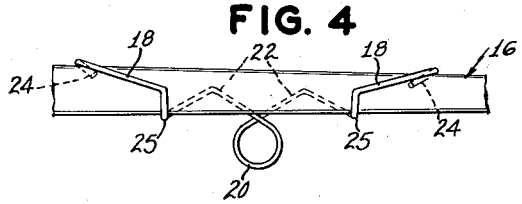
INVENTOR.
Mortimer L. Chanko
BY
ATTORNEYS

United States Patent Office 2,968,076
Patented Jan. 17, 1961

2,968,076
HOLDER MEANS FOR SPECTACLES
Mortimer L. Chanko, 250 Kingsland Terrace, South Orange, N.J.
Filed June 24, 1957, Ser. No. 667,538
1 Claim. (Cl. 24—3)

My present invention relates to spectacle holder means of the type used for suspending eyeglasses from the user's neck, in a convenient position, when the eyeglasses are removed from their operative position.

One of the objects of this invention is to provide a spectacle holder which can be readily attached to eyeglass temples of various sizes and cross-sectional shapes.

Another object is the provision of a spectacle holder which can be easily adjusted longitudinally of the temples to suit the user's preferences and which are removably secured in position automatically by being placed on the temples, additional manipulations being unnecessary.

A further object is the provision of a spectacle holder with securing elements which are of pleasing appearance and which are also inexpensive and easy to use and to attach to and remove from the spectacle temples.

The above and other objects, features, and advantages of this invention will be fully understood from the following description considered in connection with the accompanying illustrative drawings of the presently preferred embodiment of this invention.

In the drawings:

Fig. 1 is a perspective view of eyeglasses provided with the holder of this invention;

Fig. 2 is a perspective view, on a larger scale, of parts of the eyeglasses and holder shown in Fig. 1;

Fig. 3 is an enlarged outer side view of a holder-attaching element according to this invention, showing it in position on the temple of the eyeglasses;

Fig. 4 is a view of the holder, similar to Fig. 3 but at the inner side of the temple; and Fig. 5 is an enlarged sectional view on the line 5—5 of Fig. 3.

Referring now to the drawings in detail, the holder 10 comprises a flexible support 12 provided with the attaching elements 14 of the present invention. Said flexible support or band 12 is preferably in the form of a chain composed of small links but may be a ribbon or a cord or of any other suitable form. As illustrated, the band 12 is attached to the temples 16 of the eyeglasses and it will be understood that the band 12 is of sufficient length to enable the eyeglasses to be suspended from the user's neck in a position at the chest convenient to the wearer.

Both attaching elements 14 are of the same construction. Said attaching element 14 is made of spring wire and comprises the spring arms 18 which extend in diverging relation from a central spring part having an eye 20 and diverging arms 22. The arms 18 terminate in hook-like ends 24 which resiliently grip the upper edge of the temple. The arms 18 are disposed at the inner side of the temple and the central part comprising the eye 20 and arms 22 are disposed at the outer side of the temple near the lower edeg thereof and resiliently engage the outer side of the temple adjacent that portion thereof. Arms 22 have transverse portions 25 which extend transversely of the temple and underlie the lower edge thereof as illustrated in Fig. 4.

The holder can be readily attached to the temples 16 by inserting the temple between the arms 18 at the inner side of the temple and the parts 20 and 22 at the outer side, by transverse movement of the temple relatively to the plane of element 14, and this can be facilitated by moving the arms resiliently toward each other, by pressing on the hooked ends 24, so that said arms and parts are in the positions indicated at 18' and 20' and 22' in Fig. 3. Upon release of the hooked end 24', when the temple is thus positioned, the attaching element 14 grips the temple resiliently and is thus securely attached to the temple in any desired adjusted position longitudinally thereof. It will be observed that after the attaching element is secured to the temple said element can be moved longitudinally to a desired position without detaching the element from the temple. This can be done without pressing arms 18 toward each other or, alternatively, by pressing them slightly toward each other to ease the grip of the element on the temple but without disengagement therefrom. The spring part 20 is in the form of an eye or loop and thus provides a convenient means for attachment of the band 12 to element 14.

It will be noted that the attaching elements 14 are thin and light and are of pleasing appearance, and it will be noted further that they are free of any enlarged or bulky parts which might cause discomfort or be otherwise objectionable, and finally it will be observed that they can be readily attached and adjusted in position as described above and that they are well adapted to accomplish all of the objects of the invention.

While I have shown and described the presently preferred embodiment of the invention, it will be understood that the invention may be embodied otherwise than as herein specifically illustrated or described and that in the illustrated embodiment certain changes in the details of construction and in the form and arrangement of parts may be made without departing from the underlying idea of the invention. Accordingly, I do not wish to be limited to the precise construction which is shown or described herein, except as may be required by the scope of the appended claim.

Having thus described my invention, what I claim and desire to secure by Letters Patent is:

In a holder for supporting spectacles having temples from a wearer's neck when the spectacles are removed from the wearer's eyes and which includes a supporting band, means for releasably attaching said band to the temples of the spectacles, said attaching means comprising a resilient member having parts engageable with the temple at the upper and lower edge portions thereof and at the inner and outer sides, respectively, said resilient member having a spring loop, arms integral with said loop and crossing each other and extending from the opposite ends thereof, respectively, of the latter and disposed in the same plane therewith, and arms integral with said first-mentioned arms respectively, and offset laterally therefrom and extending therefrom in diverging relation in a plane parallel to the plane of said loop, said first-mentioned arms having parts engageable with one of said edge portions of the temple and said other arms having parts engageable with the other edge portion of said temple.

References Cited in the file of this patent
UNITED STATES PATENTS

| | | |
|---|---|---|
| 1,347,942 | Forward | July 27, 1920 |
| 1,372,225 | Gray | Mar. 22, 1921 |
| 1,972,452 | Lingo | Sept. 4, 1934 |
| 2,260,411 | Smith | Oct. 28, 1941 |
| 2,416,477 | Gamache | Feb. 25, 1947 |
| 2,496,811 | Newton | Feb. 7, 1950 |
| 2,596,835 | Benge | May 13, 1952 |
| 2,649,020 | Wheeler | Aug. 18, 1953 |
| 2,835,945 | Hilsinger | May 27, 1958 |

OTHER REFERENCES

Optical Journal Review, Volume No. XCII, Issue No. 4, Feb. 15, 1955.